United States Patent
Hanada et al.

(10) Patent No.: US 7,828,093 B2
(45) Date of Patent: Nov. 9, 2010

(54) VEHICLE CONTROLLER, VEHICLE AND VEHICLE CONTROL METHOD

(75) Inventors: Hideto Hanada, Toyota (JP); Sojiro Yokoyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 416 days.

(21) Appl. No.: 11/992,854

(22) PCT Filed: Aug. 24, 2006

(86) PCT No.: PCT/JP2006/317160

§ 371 (c)(1),
(2), (4) Date: Mar. 31, 2008

(87) PCT Pub. No.: WO2007/018321

PCT Pub. Date: Feb. 15, 2007

(65) Prior Publication Data

US 2009/0159350 A1 Jun. 25, 2009

(30) Foreign Application Priority Data

Dec. 26, 2005 (JP) ............................. 2005-372615

(51) Int. Cl.
*B60W 10/04* (2006.01)
(52) U.S. Cl. ............... 180/65.265; 180/65.285; 180/65.275; 180/415; 701/22
(58) Field of Classification Search ............ 180/65.265, 180/65.285, 65.1, 65.275, 65.28, 415; 701/22, 701/42, 70; 318/468, 466, 112, 480
See application file for complete search history.

(56) References Cited

U.S. PATENT DOCUMENTS

| 4,840,243 | A | * | 6/1989 | Hirabayashi et al. | ........ 180/415 |
| 5,021,957 | A | * | 6/1991 | Yoshino et al. | ............... 701/70 |
| 5,132,604 | A | * | 7/1992 | Shimane et al. | ............... 322/10 |
| 5,524,079 | A | * | 6/1996 | Ishida et al. | .................. 701/42 |
| 5,645,508 | A | * | 7/1997 | Kim | ......................... 74/336 R |
| 5,818,188 | A | * | 10/1998 | Hirai et al. | ................... 318/480 |
| 6,246,192 | B1 | * | 6/2001 | Haass | ........................ 318/112 |
| 6,520,879 | B2 | * | 2/2003 | Kawabata et al. | ....... 180/65.285 |
| 6,841,960 | B2 | * | 1/2005 | Yamada et al. | .............. 318/468 |

(Continued)

FOREIGN PATENT DOCUMENTS

JP          A-64-012816          1/1989

(Continued)

*Primary Examiner*—Hau V Phan
(74) *Attorney, Agent, or Firm*—Oliff & Berridge, PLC

(57) ABSTRACT

A controller for a vehicle including at least one motor driving wheels, an inverter driving the motor, and a boosting converter supplying a dc power supply current to the inverter, is provided with a control portion performing rectangular wave control and non-rectangular wave control on the inverter in a switched manner. The control portion has an emergency switching condition for switching control from the rectangular wave control to the non-rectangular wave control, as a determination reference, and when the emergency switching condition is satisfied while the rectangular wave control is being executed (YES at step S5), the control portion instructs the boosting converter to lower target output voltage (S7). Preferably, the control portion determines that the emergency switching condition is satisfied when a q-axis current supplied from the inverter to the motor exceeds a prescribed threshold value.

16 Claims, 13 Drawing Sheets

U.S. PATENT DOCUMENTS

| | | | |
|---|---|---|---|
| 7,058,487 B2 * | 6/2006 | Hara et al. | 701/22 |
| 7,455,133 B2 * | 11/2008 | Kaneko et al. | 180/65.285 |
| 2002/0115516 A1 * | 8/2002 | Kawabata et al. | 475/5 |
| 2003/0155878 A1 | 8/2003 | Murai | |

FOREIGN PATENT DOCUMENTS

| | | |
|---|---|---|
| JP | A-2000-358393 | 12/2000 |
| JP | A-2001-078495 | 3/2001 |
| JP | A-2001-295676 | 10/2001 |
| JP | A-2003-244990 | 8/2003 |
| JP | A-2005-045880 | 2/2005 |
| JP | A-2005-094837 | 4/2005 |
| JP | A-2005-155862 | 6/2005 |
| JP | A-2005-204425 | 7/2005 |
| JP | A-2005-253207 | 9/2005 |

\* cited by examiner

| | BH | BL |
|---|---|---|
| Hi | O | |
| Lo | | O |

FIG.14

|  | C1 | C2 | C3 | B1 | B2 | F1 |
|---|---|---|---|---|---|---|
| 1ST | O |  |  |  | (O) | O |
| 2ND | O |  |  | O |  |  |
| 3RD | O | O |  |  |  |  |
| 4TH |  | O |  | O |  |  |
| REV |  |  | O |  | O |  |

(O) WHEN ENGINE BRAKE IS USED

VEHICLE CONTROLLER, VEHICLE AND VEHICLE CONTROL METHOD

TECHNICAL FIELD

The present invention relates to a vehicle controller and a vehicle and, more specifically, to a controller of a vehicle provided with a vehicle propulsion motor, the vehicle and a method of controlling the vehicle.

BACKGROUND ART

Recently, electric vehicles, hybrid vehicles and fuel-cell vehicles have attracting attention as environmentally friendly vehicles. Some hybrid vehicles have already been commercialized.

A hybrid vehicle has, in addition to a conventional engine, a dc power source, an inverter and a motor driven by the inverter as power sources. Specifically, power is obtained by driving the engine and, in addition, dc voltage from the dc power source is converted to ac voltage by the inverter, and the motor is rotated by the converted ac voltage, whereby power is obtained. An electric vehicle has a dc power source, an inverter and a motor driven by the inverter as power sources.

Japanese Patent Laying-Open No. 2001-295676 discloses torque limitation by detecting a state of slip using angular acceleration of a driving shaft in a hybrid vehicle.

FIG. 20 is an illustration showing a slipping state and a gripped state of a vehicle.

Referring to FIG. 20, when a vehicle travels and runs upon a projection on the road surface, for example, upon a road shoulder or an object fallen on the road, the tire is brought to a slipping state, in which the tire rotates idle, immediately thereafter at time point t1. In the slipping state, there is no surface resistance, and therefore, when the wheels are rotated continuously with the same torque, the rotation speed of the wheels increases.

The output (power) is in proportion to torque×rotation speed, and therefore, when a slip occurs, much electrical power (power) is consumed in a motor that drives wheels. Consequently, control is imposed such that more power is supplied to the motor.

On the contrary, at time point t2 after the slipping state, the tire again comes into contact with the road surface, and the rotation speed of the tire decreases abruptly, because of friction from the road surface. As the rotation speed of the tire decreases, the rotation speed of the motor also decreases abruptly.

It is also proposed, in a hybrid vehicle or the like, to boost the dc voltage from the power source by a boosting converter, to convert the boosted dc voltage by the inverter to an ac voltage and to drive the motor thereby.

In such a configuration including a boosting converter, when the rotation speed of the motor decreases abruptly, excessive electrical power would be supplied from the boosting converter to the inverter. Therefore, it becomes necessary to lower the target voltage of the boosting converter.

Japanese Patent Laying-Open No. 2001-295676 does not disclose any control of the boosting converter at the transition from the slipping state to the gripped state.

DISCLOSURE OF THE INVENTION

An object of the present invention is to provide a vehicle controller and a vehicle that can immediately avoid generation of excessive voltage.

In short, the present invention provides a controller for a vehicle including at least one motor driving wheels, an inverter driving the motor, and a boosting converter supplying a dc power supply current to the inverter, including a control portion exerting rectangular wave control and non-rectangular wave control on the inverter in a switched manner. The control portion has, as one reference for determination, an emergency switching condition for switching from the rectangular wave control to the non-rectangular wave control upon detection of a wheel slip, and when the emergency switching condition is satisfied while the rectangular wave control is being executed, the control portion instructs the boosting converter to perform a process to prevent excessive voltage of the inverter.

Preferably, the control portion indicates a target voltage of boosting to the boosting converter, and the target voltage is lowered as the process for preventing excessive voltage of the inverter.

Preferably, the non-rectangular wave control is overmodulation PWM control or sinusoidal PWM control.

Preferably, the control portion determines whether the emergency switching condition is satisfied or not in accordance with a current flowing from the inverter to the motor.

More preferably, the control portion determines that the emergency switching condition is satisfied when a q-axis current supplied from the inverter to the motor exceeds a prescribed threshold value.

More preferably, the prescribed threshold value of the q-axis current is determined in advance in correspondence to an I-axis current supplied from the inverter to the motor.

Preferably, the vehicle further includes a multi-speed transmission for transmitting, with variable speed, driving force of the motor to an axle. The control portion changes an instruction to the boosting converter in accordance with the speed of the multi-speed transmission, when the emergency switching condition is satisfied.

According to another aspect, the present invention provides a vehicle, including: at least one motor driving wheels; an inverter driving the motor; a boosting converter supplying a dc power supply current to the inverter; and a control portion performing rectangular wave control and non-rectangular wave control on the inverter in a switched manner. The control portion has an emergency switching condition for switching control from the rectangular wave control to the non-rectangular wave control upon detection of a slip of a wheel, as a determination reference, and when the emergency switching condition is satisfied while the rectangular wave control is being executed, the control portion instructs the boosting converter to perform a process for preventing excessive voltage of the inverter.

Preferably, the control portion indicates a target voltage of boosting to the boosting converter, and the target voltage is lowered as the process for preventing excessive voltage of the inverter.

Preferably, the non-rectangular wave control is overmodulation PWM control or sinusoidal PWM control.

Preferably, the control portion determines whether the emergency switching condition is satisfied or not in accordance with a current flowing from the inverter to the motor.

Preferably, the control portion determines that the emergency switching condition is satisfied when a q-axis current supplied from the inverter to the motor exceeds a prescribed threshold value.

More preferably, the prescribed threshold value of the q-axis current is determined in advance in correspondence to an I-axis current supplied from the inverter to the motor.

Preferably, the vehicle further includes a multi-speed transmission for transmitting, with variable speed, driving force of the motor to an axle. The control portion changes an instruction to the boosting converter in accordance with the speed of the multi-speed transmission, when the emergency switching condition is satisfied.

According to a still further aspect, the present invention provides a method of controlling a vehicle including at least one motor driving wheels, an inverter driving the motor, and a boosting converter supplying a dc power supply current to the inverter, including the steps of: determining whether rectangular wave control is being executed on the inverter or not; and instructing, when an emergency switching condition for switching control from the rectangular wave control to non-rectangular wave control is satisfied upon detection of a slip of a wheel, while the rectangular wave control is being executed, the boosting converter to perform a process for preventing excessive voltage of the inverter.

More preferably, the vehicle further includes a multi-speed transmission for transmitting, with variable speed, driving force of the motor to an axle. The control method further includes the step of changing an instruction to the boosting converter in accordance with the speed of the multi-speed transmission, when the emergency switching condition is satisfied.

According to the present invention, control failure can be prevented in an emergency in which the rotation speed varies over a wide range at the time of a slip and the like, by switching from the rectangular wave control of lower control response to non-rectangular wave control of higher response and, in addition, excessive voltage at the inverter can be prevented with sufficient margin.

When a multi-speed transmission is provided, the range of energy fluctuation at the gripping after a slip differs from one speed to another. Therefore, by setting the control mode and the target voltage corresponding to the gearshift, it becomes possible to minimize the range of variation of the target voltage and to prevent excessive voltage at the inverter.

BRIEF DESCRIPTION OF THE DRAWINGS

FIG. 14 illustrates the gear change operation of a transmission 401.

BEST MODES FOR CARRYING OUT THE INVENTION

Figure 1:
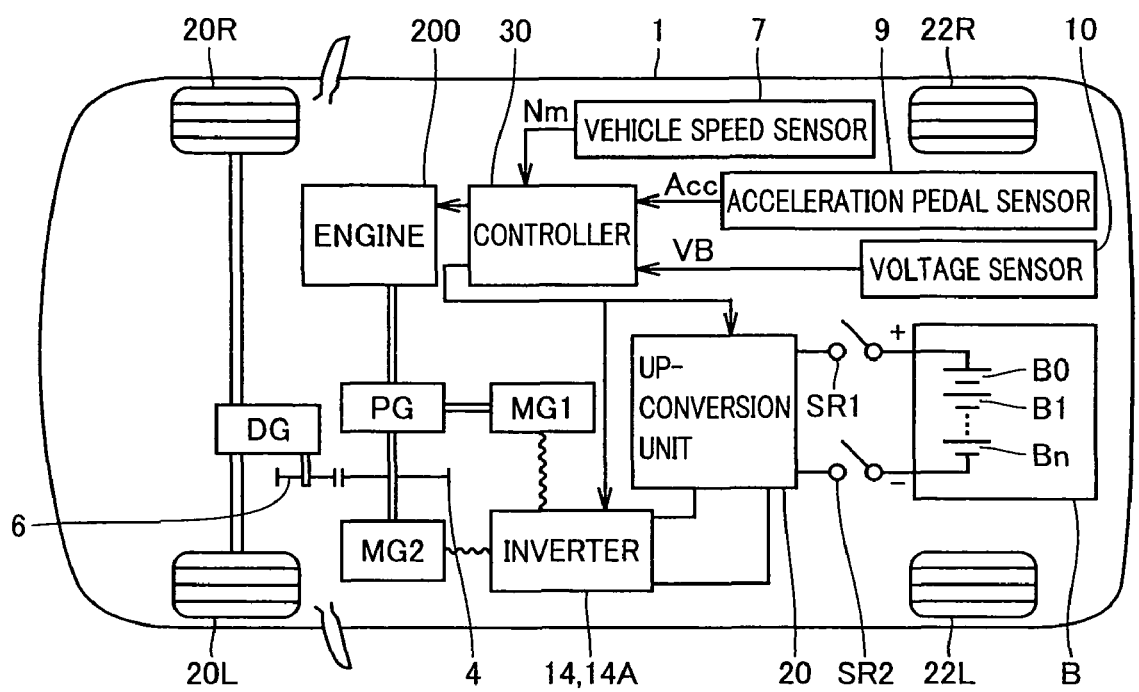
FIG. 1 is a block diagram showing a configuration of a hybrid vehicle 1 in accordance with an embodiment of the present invention.

In the following, embodiments of the present invention will be described in detail with reference to the figures. Throughout the figures, the same or corresponding portions are denoted by the same reference characters, and description thereof will not be repeated.

Embodiment 1

FIG. 1 schematically shows a configuration of a hybrid vehicle 1 in an embodiment of the present invention.

With reference to FIG. 1, hybrid vehicle 1 includes front wheels 20R and 20L, rear wheels 22R and 22L, an engine 200, a planetary gear PG, a differential gear DG, and gears 4 and 6.

Hybrid vehicle 1 further includes a battery B, an up-conversion unit 20 up-converting voltage in a direct current (dc) power output from battery B, and inverters 14, 14A communicating the dc power with up-conversion unit 20.

Hybrid vehicle 1 further includes a motor generator MG1 receiving power of engine 200 via planetary gear PG to generate electrical power, and a motor generator MG2 having a rotation shaft connected to planetary gear PG. Inverters 14, 14A are connected to motor generators MG1 and MG2 to provide conversion between alternate current (ac) power and dc power provided from the up-conversion circuit.

Planetary gear PG includes a sun gear, a ring gear, a pinion gear meshing with both the sun and ring gears, and a planetary carrier rotatably supporting the pinion gear around the sun gear. Planetary gear PG has first to third rotation shafts. The first rotation shaft is that of the planetary carrier, connected to engine 200. The second rotation shaft is that of the sun gear, connected to motor generator MG1. The third rotation shaft is that of the ring gear, connected to motor generator MG2.

The third rotation shaft has gear 4 attached thereto, which gear 4 drives gear 6 to transfer power to differential gear DG. Differential gear DG receives the power from gear 6 and transfers the power to front wheels 20R and 20L, and also transfers torque of front wheels 20R and 20L via gears 6 and 4 to the third rotation shaft of planetary gear PG.

Planetary gear PG serves to split power between engine 200 and motor generators MG1 and MG2. More specifically, when rotation of two rotation shafts of planetary gear PG is determined, the rotation of the remaining one rotation shaft will naturally be determined. Accordingly, engine 200 is operated in the most efficient range while the amount of power generated by motor generator MG1 is controlled, and motor generator MG2 is driven to control vehicle speed, to realize a generally energy-efficient vehicle.

Battery B as a dc power source is, for example, implemented by a nickel metal hydride, lithium ion, or similar secondary battery, and supplies dc power to up-conversion unit 20 and is also charged with dc power provided from up-conversion unit 20.

Up-conversion unit 20 up-converts dc voltage received from battery B and supplies the up-converted dc voltage to inverters 14, 14A. Inverters 14, 14A receive the supplied dc voltage and convert it to ac voltage, and control and drive motor generator MG1 when the engine is started. Furthermore, after the engine is started, ac power generated by motor generator MG1 is converted by inverters 14, 14A to a direct current and converted by up-conversion unit 20 to a voltage suitable for charging battery B, and thus battery B is charged.

Furthermore, inverters 14, 14A drive motor generator MG2. Motor generator MG2 assists engine 200 to drive front wheels 20R and 20L. In braking the vehicle, motor generator MG2 regeneratively operates to convert the rotation energy of the wheels to electrical energy. The obtained electrical energy is returned via inverters 14, 14A and up-conversion unit 20 to battery B.

Battery B is a set of batteries including a plurality of series-connected battery units B0-Bn. Between up-conversion unit 20 and battery B, system relays SR1, SR2 are provided to disconnect high voltage when the vehicle is not operated.

Hybrid vehicle 1 further includes an acceleration pedal position sensor 9 detecting the position of an accelerator pedal, which is an input portion receiving an instruction from a driver requesting acceleration, a voltage sensor 10 attached to battery B, and a controller 30 controlling engine 200, inverters 14, 14A, and up-conversion unit 20, in response to an accelerator pedal angle Acc received from acceleration pedal position sensor 9 and a voltage value VB received from voltage sensor 10. Voltage sensor 10 detects and transmits a voltage VB of battery B to controller 30.

Figure 2:
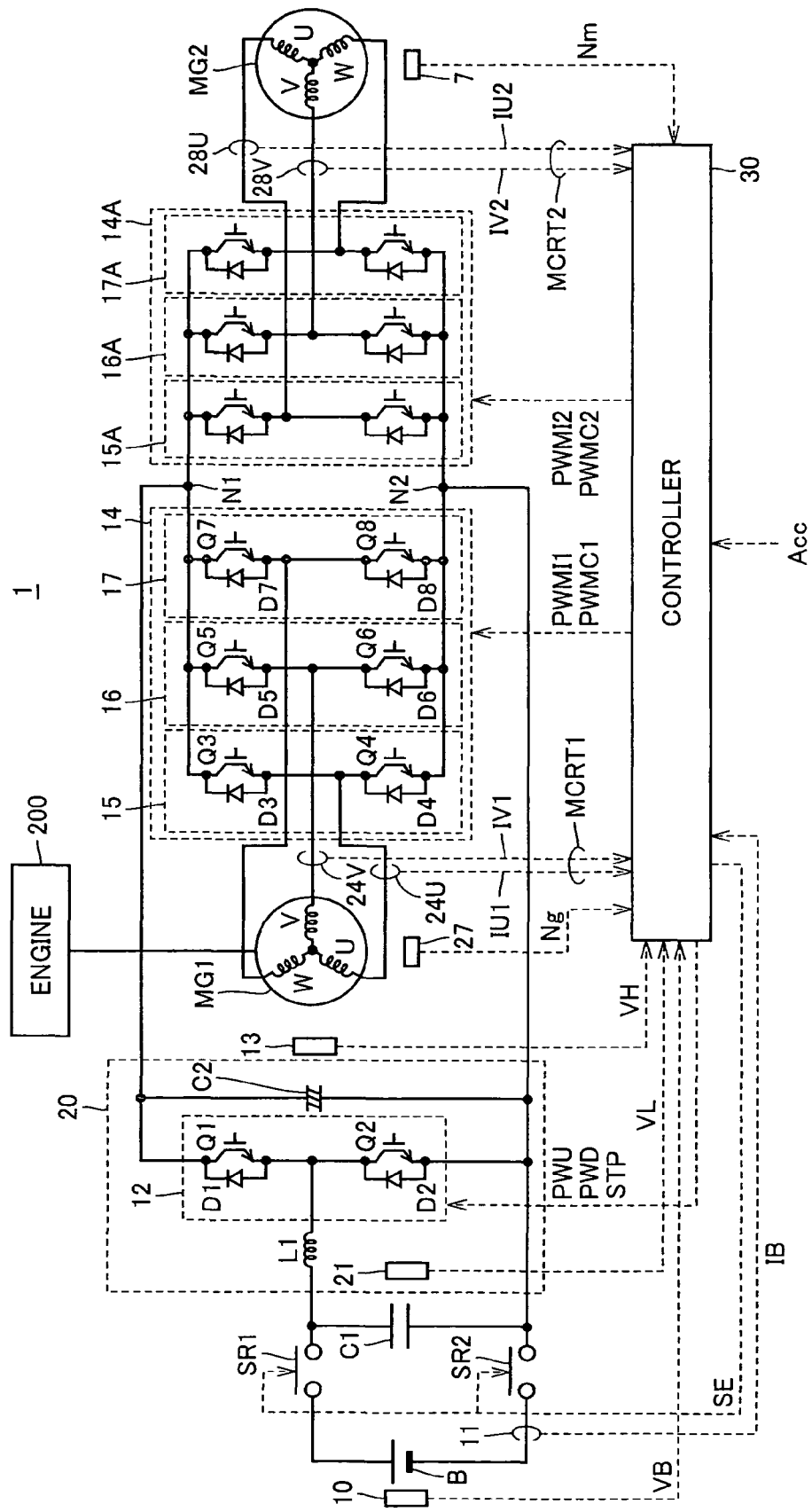
FIG. 2 is a circuit diagram showing, in detail, portions related to an inverter and an up-conversion unit of hybrid vehicle 1 of FIG. 1.

FIG. 2 is a circuit diagram specifically showing portions related to an inverter and an up-conversion unit of hybrid vehicle 1 of FIG. 1.

With reference to FIG. 2, hybrid vehicle 1 includes battery B, voltage sensor 10, system main relays SR1, SR2, capacitor C1, up-conversion unit 20, inverters 14, 14A, current sensors 24U, 24V, motor generators MG1, MG2, engine 200 and controller 30.

Motor generator MG1 mainly operates as an electric motor during running, and operates as a motor for cranking engine 200 during acceleration from the stopped state of the vehicle or from EV running in which the vehicle runs with the engine stopped. Motor generator MG2 rotates in synchronization with a driving wheel. Engine 200 and motor generators MG1 and MG2 are connected to planetary gear PG shown in FIG. 1. Therefore, when rotation speed of at least two rotation shafts among the rotation shafts of the engine and motor generators MG1 and MG2 are determined, the rotation speed of the remaining one rotation shaft is determined in a forced manner.

Battery B is a nickel metal hydride, lithium ion, or similar secondary battery. Voltage sensor 10 detects a dc voltage value VB output from battery B and outputs the detected dc voltage value VB to controller 30. System main relays SR1 and SR2 are turned on/off by a signal SE provided from controller 30. More specifically, system main relays SR1, SR2 are turned on by signal SE having H (logical high) level and turned off by signal SE having L (logical low) level.

Capacitor C1 smoothes voltage between terminals of battery B when system main relays SR1, SR2 are turned on.

Up-conversion unit 20 includes a voltage sensor 21, a reactor L1, a converter 12, and a capacitor C2. Reactor L1 has one end connected via system main relay SR1 to a positive electrode of battery B.

Current sensor 11 detects a dc current flowing between battery B and up conversion unit 20 and outputs the detected current as a dc current value IB to controller 30.

Converter 12 includes IGBT devices Q1 and Q2 connected in series between output terminals of converter 12 outputting a voltage VH, and diodes D1 and D2 connected parallel to IGBT devices Q1 and Q2, respectively.

Reactor L1 has the other end connected to an emitter of IGBT device Q1 and to a collector of IGBT device Q2. Diode D1 has a cathode connected to a collector of IGBT device Q1, and an anode connected to the emitter of IGBT device Q1. Diode D2 has a cathode connected to the collector of IGBT device Q2, and an anode connected to an emitter of IGBT device Q2.

Voltage sensor 21 detects, as a voltage value VL, a voltage of converter 12 that is present at an input thereof. Current sensor 11 detects, as current value IB, a current flowing through reactor L1. Capacitor C2 is connected to an output side of converter 12 and stores energy sent from converter 12, and also smoothes voltage. Voltage sensor 13 detects the voltage on the output side of converter 12, that is, the voltage between electrodes of capacitor C2, as a voltage value VH.

In a hybrid vehicle, engine 200 and motor generator MG1 exchange mechanical power, and motor generator MG1 sometimes starts the operation of the engine and sometimes motor generator MG1 serves as a generator generating electrical power receiving the power from the engine. Motor generator MG1 is driven by inverter 14.

Inverter 14 receives an up-converted potential from converter 12 to drive motor generator MG1. Furthermore, inverter 14 returns to converter 12 the power generated by motor generator MG1 as the vehicle is regeneratively braked. In doing so, converter 12 is controlled by controller 30 to operate as a down-conversion circuit.

Inverter 14 includes a U-phase arm 15, a V-phase arm 16, and a W-phase arm 17. U-phase arm 15, V-phase arm 16, and W-phase arm 17 are connected in parallel between output lines of converter 12.

U-phase arm 15 includes series connected IGBT devices Q3 and Q4, and diodes D3 and D4 connected parallel to IGBT devices Q3 and Q4, respectively. Diode D3 has a cathode connected to a collector of IGBT device Q3, and an anode connected to an emitter of IGBT device Q3. Diode D4 has a cathode connected to a collector of IGBT device Q4, and an anode connected to an emitter of IGBT device Q4.

V-phase arm 16 includes series connected IGBT devices Q5 and Q6, and diodes D5 and D6 connected parallel to IGBT devices Q5 and Q6, respectively. Diode D5 has a cathode connected to a collector of IGBT device Q5, and an anode connected to an emitter of IGBT device Q5. Diode D6 has a cathode connected to a collector of IGBT device Q6, and an anode connected to an emitter of IGBT device Q6.

W-phase arm 17 includes series connected IGBT devices Q7 and Q8, and diodes D7 and D8 connected parallel to IGBT devices Q7 and Q8, respectively. Diode D7 has a cathode connected to a collector of IGBT device Q7, and an anode connected to an emitter of IGBT device Q7. Diode D8 has a cathode connected to a collector of IGBT device Q8, and an anode connected to an emitter of IGBT device Q8.

Each phase arm has an intermediate point connected to a phase end of a phase coil of motor generator MG1. More specifically, motor generator MG1 is a 3-phase, permanent magnet motor with three, U, V and W phase coils each having one end connected to a neutral point. The U-phase coil has the other end connected to a node connecting IGBT devices Q3 and Q4 together. The V-phase coil has the other end connected to a node connecting IGBT devices Q5 and Q6 together. The W-phase coil has the other end connected to a node connecting IGBT devices Q7 and Q8 together.

Current sensors 24U and 24V detect current values IU1 and IV1 of the current flowing through the U-phase and V-phase stator coils of motor generator MG1 as motor current value MCRT1, and outputs the motor current value MCRT1 to controller 30. Rotation speed Ng of motor generator MG1 is detected by a vehicle speed sensor 27.

Controller 30 receives a torque control value TR1, rotation speed Ng of the motor, voltage values VB, VL and VH, current values IB and IC, and motor current value MCRT1.

Inverter 14A receives an up-converted potential from converter 12 to drive motor generator MG2. Furthermore, inverter 14A returns to converter 12 the power generated by motor generator MG2 as the vehicle is regeneratively braked. In doing so, converter 12 is controlled by controller 30 to operate as a down-conversion circuit. Motor generator MG2 rotates at a rate Nm, which is detected by a vehicle speed sensor 7.

Inverter 14A includes U, V and W phase arms 15A, 16A, and 17A, respectively, connected in parallel between output lines of converter 12. U, V and W phase arms 15A, 16A and 17A are similar in configuration to U, V and W phase arms 15, 16 and 17, respectively. Therefore, description thereof will not be repeated.

Intermediate points of the U, V and W phase arms of inverter 14A are respectively connected to one end of U, V and W phase coils of the motor generator MG2. More specifically, motor generator MG2 is a 3-phase, permanent magnet motor with three U, V and W phase coils each having the other end connected to a neutral point.

Current sensors 28U, 28V detect motor current values IU2 and IV2 flowing through the U-phase and V-phase stator coils of motor generator MG2 as motor current value MCRT2, and outputs motor current value MCRT2 to controller 30.

Controller 30 receives torque control value TR1, the motor rotation speed Ng, voltage values VB, VL and VH, current values IB and IC and motor current value MRCT1, and in addition thereto, a torque control value TR2, the rotation speed Nm of the motor and motor current value MCRT2 corresponding to motor generator MG2.

In response to these inputs, controller 30 outputs to up-conversion unit 20 an instruction PWU to execute up-conversion, an instruction PWD to execute down-conversion, and an instruction STP to stop.

Furthermore, controller 30 outputs to inverter 14 an instruction PWMI1 to convert a dc voltage corresponding to an output of converter 12 to an ac voltage for driving motor generator MG1 and an instruction PWMC1 to convert ac voltage regenerated by motor generator MG1 to dc voltage and return the dc voltage to converter 12.

Furthermore, controller 30 outputs to inverter 14A an instruction PWMI2 to convert a dc voltage corresponding to an output of converter 12 to an ac voltage for driving motor generator MG2 and a regeneration instruction PWMC2 to convert ac voltage regenerated by motor generator MG2 to dc voltage and return the dc voltage to converter 12.

Next, an operation of up-conversion unit 20 will be briefly described. During power running, converter 12 in up-conversion unit 20 operates as an up-converting circuit, that is, a forward converting circuit supplying electrical power from battery B to inverter 14. Converter 12 also operates, during regenerative operation, as a down-converting circuit, that is, a backward converting circuit feeding electrical power generated by motor generator MG1 to battery B.

Converter 12 operates as an up-converting circuit when IGBT device Q2 is turned on/off, with IGBT device Q1 kept off. Specifically, when IGBT device Q2 is on, a path is formed from the positive electrode of battery B through reactor L1 and IGBT device Q2 to the negative electrode of battery B, through which the current flows. While the current flows, energy is stored in reactor L1.

When the IGBT device Q2 is off, the energy stored in reactor L1 flows through diode D1 to inverter 14. Consequently, the voltage between electrodes of capacitor C2 increases. Therefore, the output voltage of converter 12 applied to inverter 14 is boosted. Here, in order to reduce loss, IGBT device Q1 may be rendered conductive in synchronization with the conduction period of diode D1.

On the other hand, converter 12 operates as a down-converting circuit when IGBT device Q1 is turned on/off, with IGBT device Q2 kept off. Specifically, when IGBT device Q1 is on, the current regenerated from inverter 14 flows through IGBT device Q1 and reactor L1 to battery B.

Further, when IGBT device Q1 is off, a loop of reactor L1, battery B and diode D2 is formed, and the energy stored in reactor L1 is returned to battery B. Here, in order to reduce loss, IGBT device Q2 may be rendered conductive in synchronization with the conduction period of diode D2. In this reverse direction conversion, the time period in which battery B receives electrical power becomes longer than the time period in which inverter 14 supplies electrical power, and therefore, the voltage at inverter 14 is lowered and returned to battery B. The operation of up-conversion unit 20 is realized by appropriately controlling the power running operation and the regenerating operation described above.

The regenerative braking here refers to braking with regeneration through a foot brake operation by a driver of the hybrid vehicle or an electric vehicle. Further, the regenerative braking includes deceleration or stopping acceleration of the vehicle while regenerating power, by releasing the accelerator pedal during running, without operating the foot brake.

Inverter 14A is connected in parallel with inverter 14, between nodes N1 and N2, and further connected to up-conversion unit 20.

Figure 3:
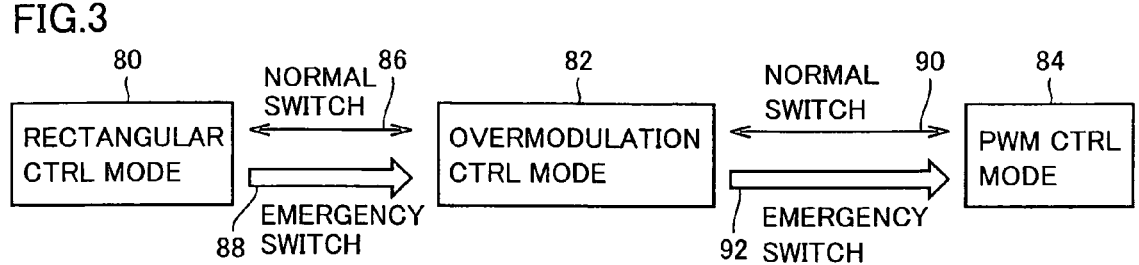
FIG. 3 shows state transitions among control modes of the inverter mounted on hybrid vehicle 1.

FIG. 3 shows state transitions among control modes of the inverter mounted on hybrid vehicle 1.

Referring to FIG. 3, controller 30 of FIG. 1 controls inverters 14 and 14A while switching among three control modes, that is, rectangular wave control mode, overmodulation control mode and PWM (pulse width modulation) control mode.

In PWM (pulse width modulation) control, effective value of fundamental wave component of the voltage waveform, that is, the modulation factor, is in the range of 0 to 0.61, and the pulse voltage or current obtained by pulse-width modulation of fundamental wave with a carrier wave is supplied to the motor. In PWM current control in which voltage of PWM waveform is applied to an ac electric motor, smooth rotation is possible even in a low speed range. There is a problem, however, that the voltage utilization ratio of the dc power source is limited. As a countermeasure, high rotation may be attained by applying a field-weakening current to the ac electric motor. This approach, however, is not perfect, as it increases ohmic loss.

Another method of controlling driving of the ac electric motor is application of a rectangular wave voltage to the ac electric motor. According to the rectangular wave control method, a rectangular wave synchronized with the fundamental wave is applied. In the rectangular wave control method, voltage utilization ratio of the dc power source can be improved to the modulation factor of about 0.78 and, as a result, output in the high-speed range can be improved. Further, as the field-weakening current can be reduced, ohmic loss is reduced and energy efficiency can be increased. Further, as the number of switchings at the inverter can be made small, switching loss can advantageously be reduced. In the low speed range, however, smooth rotation cannot be attained, as the switching period is long.

Further, as an intermediate control between the PWM control and the rectangular wave control, overmodulation control is also effected. In the overmodulation control, the modulation factor is in the range of 0.61 to 0.78. In the overmodulation control, the duty ratio of each pulse of PWM control is made larger than the sinusoidal wave PWM control on the peak side and made smaller on the trough side, of the fundamental wave component.

Therefore, a configuration that allows any of PWM control, overmodulation control and rectangular wave control of the ac electric motor is provided and the control is selectively used depending on the situation, so that the output of the electric motor particularly in the high-speed range is improved.

Referring to FIG. 3, a state 80 in which rectangular wave control mode is executed, a state 82 in which overmodulation control mode is executed and a state 84 in which PWM control mode is executed, are switched, by way of example, dependent on the motor rotation speed in the normal switching operation represented by arrows 86 and 90. Specifically, in the range of low speed of rotation, control is done in the state 84 in which PWM control mode, allowing smooth rotation, is executed, and as the motor rotation speed increases, state transition is made to the state 82 in which the overmodulation control mode is executed and further to the state 80 in which the rectangular wave control mode is executed, so that the voltage utilization ratio of the dc power source is improved.

In this regard, if a slip, grip or the like occurs causing disturbance in the motor current and motor synchronization could be lost in the state 80 of rectangular wave control mode, emergency switching is made as represented by an arrow 88, to cause transition to state 82 of overmodulation control mode, in which the inverter is switched larger number of times and better controllability is attained.

Further, if similar disturbance of the motor current is observed in the state 82 of overmodulation control mode, in order to avoid mis-synchronization, emergency switching is made as represented by an arrow 92, to cause transition to state 84 of PWM control mode, in which switching is done still larger number of times and finer controllability is attained.

Figure 4:
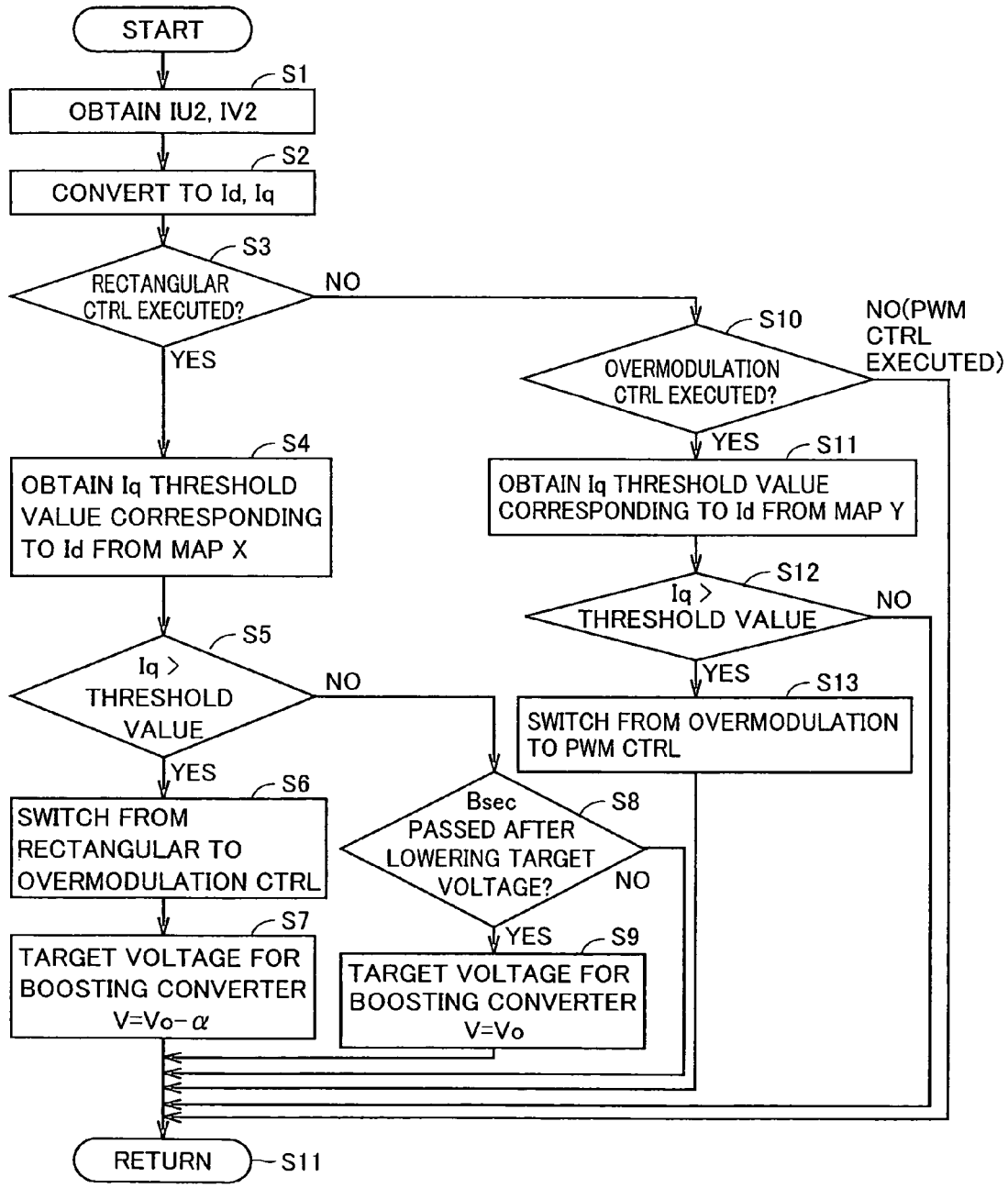
FIG. 4 is a flowchart representing the control structure of a program related to the control of boosting converter and inverter executed by a controller 30.

FIG. 4 is a flowchart representing the control structure of a program related to the boosting converter and the inverter executed by controller 30.

Referring to FIGS. 1 and 4, the vehicle controller in accordance with an embodiment of the present invention includes controller 30 performing rectangular wave control and non-rectangular wave control on the inverter in a switched manner. Controller 30 has, as one reference for determination, an emergency switching condition for switching control from the rectangular wave control to the non-rectangular wave control in accordance with the current flowing from the inverter to the motor. If the emergency switching condition is satisfied (YES at step S5) while the rectangular wave control is being executed, an instruction is given (S7) to lower the target output voltage, to up-conversion unit 20. Preferably, the controlling portion determines that the emergency switching condition is satisfied when a q-axis current supplied from inverter 14, 14A to motor generator MG1, MG2 exceeds a prescribed threshold value.

When the process starts, first, at step S1, controller 30 obtains current values IU2 and IV2 from current sensors 28U and 28V of FIG. 2, respectively.

Then, at step S2, the obtained current values are converted to a d-axis (direct-axis) current Id and a q-axis (quadrature-axis) current Iq.

Figure 5:
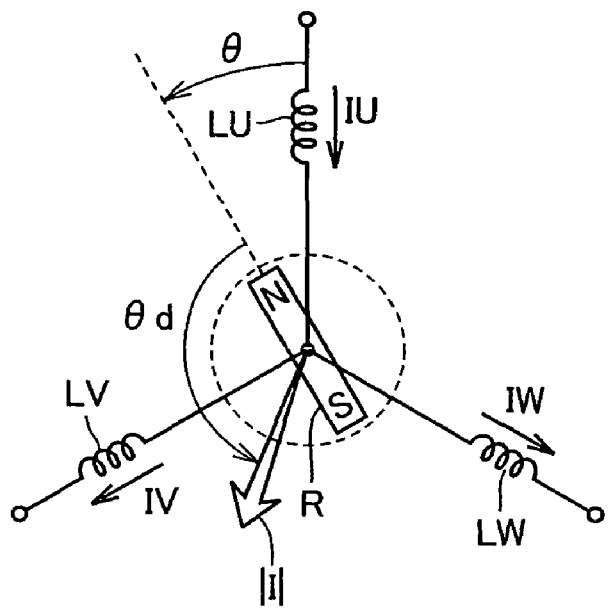
FIG. 5 is a first illustration related to a d-axis current and a q-axis current.

FIG. 5 is a first illustration related to the d-axis current and the q-axis current.

Figure 6:
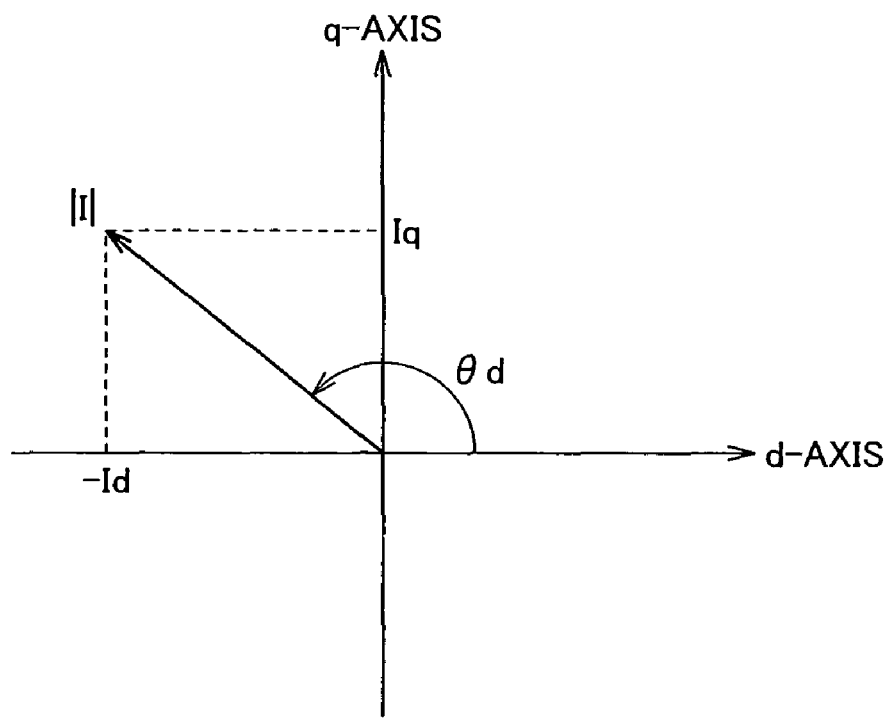
FIG. 6 is a second illustration related to the d-axis current and the q-axis current.

FIG. 6 is a second illustration related to the d-axis current and the q-axis current.

Referring to FIGS. 5 and 6, coils LU, LV and LW are U-phase, V-phase and W-phase coils of the stator, respectively. When a rotor phase with the U-phase coil LU of the rotor being a reference is represented by an electrical angle of rotation angle θ, the d-axis current Id and q-axis current Iq are given by the following equations (1) and (2), respectively.

$$Id = \sqrt{2} \times (IV \cdot \sin\theta - IU \cdot \sin(\theta - 120°)) \quad (1)$$

$$Iq = \sqrt{2} \times (IV \cdot \cos\theta - IU \cdot \cos(\theta - 120°)) \quad (2)$$

The current (combined current) |I| flowing through the stator coil represented on a dq plane is as shown in FIG. 6. As can be also seen from FIG. 5, d-axis current is the component in the direction of magnetic pole of the rotor R and q-axis current is a current component orthogonal to the direction of magnetic pole of rotor R.

After the currents are converted in accordance with the equations at step S2 of FIG. 4, the process proceeds to step S3.

At step S3, whether the present control is rectangular wave control or not is determined.

If the present control mode is the rectangular wave control mode, the process proceeds to step S4, and if not, the process proceeds to step S10.

At step S4, threshold value for the q-axis current Iq corresponding to the d-axis current Id is obtained from map X.

Figure 7:
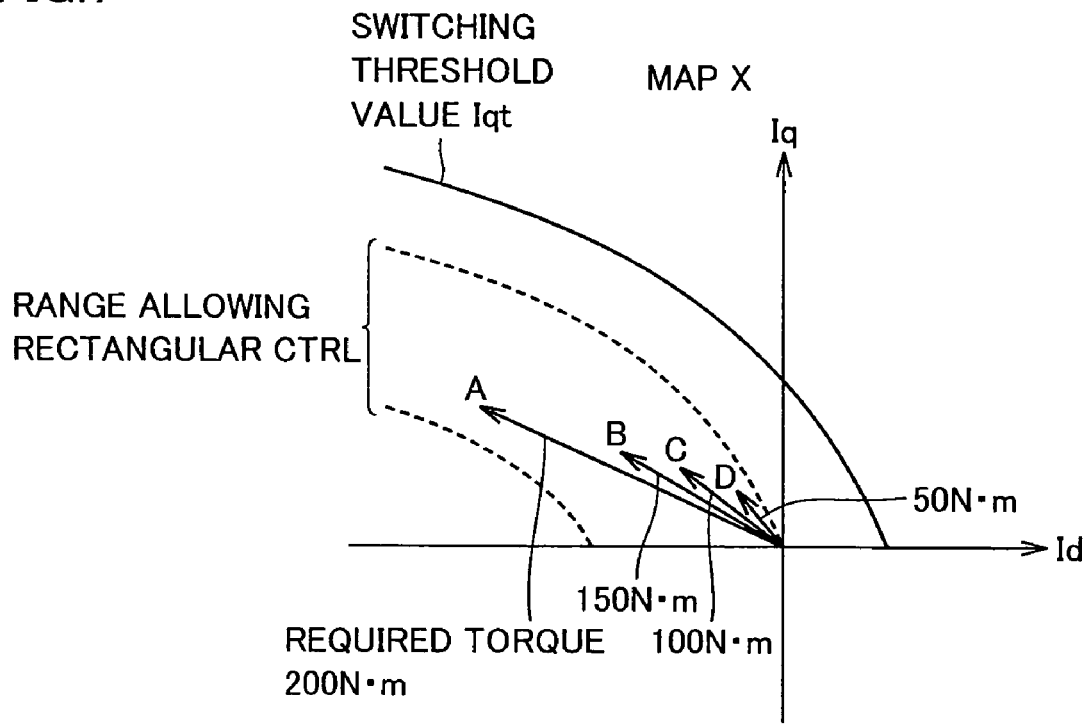
FIG. 7 is a map X of a threshold value referred to during rectangular wave control.

FIG. 7 is map X of a threshold value referred to during rectangular wave control.

Referring to FIG. 7, in the rectangular wave control, when the required torque is 200N·m, for example, the inverter is controlled such that the d-axis current and the q-axis current represented by the point A of FIG. 7 flow. Similarly, when the required torque is 150, 100 and 50 N·m, the inverter is controlled such that currents represented by the points B, C and D are applied to the motor, respectively.

The positions of these points representing currents must be within the range that allows rectangular wave control. If this allowable range of rectangular wave control is much exceeded, synchronization between the motors becomes impossible, and rectangular wave control fails. Therefore, threshold value of q-axis corresponding to each d-axis current, that is, switching threshold value Iqt is determined in advance in the map X. Whether the q-axis current exceeding the threshold value Iqt flows or not is determined at step S5.

When the q-axis current Iq exceeding the threshold value flows, the process proceeds to step S6. If the q-axis current does not exceed the threshold value, the process proceeds to step S8.

At step S6, emergency switching represented by the arrow 88 of FIG. 3 takes place, and the control mode is switched from the rectangular wave control mode to the overmodulation control mode. Then, the process proceeds to step S7, in which the target voltage V is lowered by α from the target value V0 when the current disturbance was not generated, to V=V0−α.

At step S7, α may be α=0. Specifically, in place of or in addition to intentionally lowering the target output voltage, a process to prevent excessive voltage at the inverter such as maintaining and not increasing the target output voltage, may be executed.

When the process of step S7 ends, the process proceeds to step S14, and the control returns to the main routine. When the process proceeds to step S8, whether β seconds have passed from when the target voltage was lowered at step S7 or not is determined. The time period of β seconds is sufficiently long to eliminate the excessive voltage at the inverter at the time of a grip, if a slip or grip should have occurred.

If β seconds have already passed at step S8 (YES at step S8), the process proceeds to step S9, at which the target voltage V of the boosting converter is returned to the target voltage V0 when the current disturbance was not generated.

If any process to prevent excessive voltage at the inverter has been executed other than the intentional lowering of the target output voltage at step S7, the setting for the process to prevent the excessive voltage is returned to the normal setting, at step S9

If β seconds have not yet passed at step S8 (NO at step S8), the process proceeds to step S14 and the control is returned to the main routine.

Further, if the process proceeds from step S3 to step S10, whether the overmodulation control is being executed or not is determined.

If the overmodulation control is not being executed, it means that the PWM control of best controllability is being executed, and hence, the process proceeds to step S14 and the control is returned to the main routine.

If the overmodulation control is being executed at step S10, the process proceeds to step S11, in which the threshold value of q-axis current Iq corresponding to the d-axis current Id is obtained from map Y.

Figure 8:
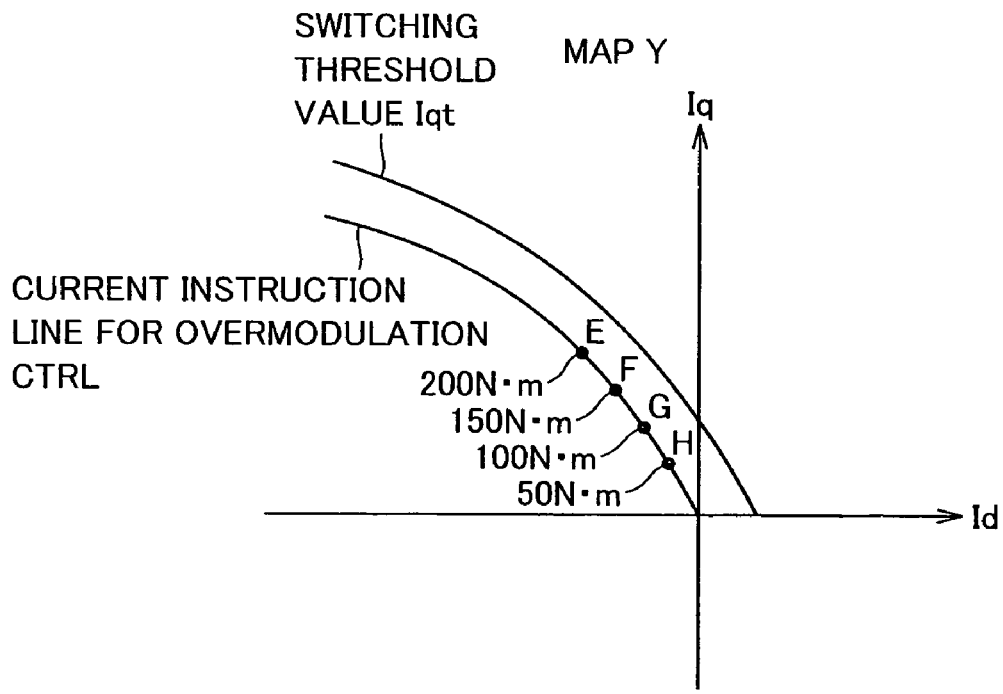
FIG. 8 is a map Y of a threshold value referred to during non-rectangular wave control.

FIG. 8 is the map Y of a threshold value referred to during non-rectangular wave control.

Referring to FIG. 8, when the overmodulation control is executed, the point representing the control current is positioned on a line of command current for overmodulation control. Specifically, control is done such that d-axis current and q-axis current represented by points E, F, G and H flow, when required torque is 200, 150, 100 and 50 N·m, respectively.

In map Y, again the switching threshold value Iqt for the d-axis current is determined, and at step S12, whether the q-axis current Id exceeds the threshold value Iqt or not is determined. If Iq>threshold value Iqt does not hold at step S12, the overmodulation control can be maintained, and therefore, the process proceeds to step S14 and the process is returned to the main routine.

If Iq>threshold value Iqt holds at step S12, the process proceeds to step S13.

At step S13, the emergency switching represented by the arrow 92 of FIG. 3 takes place, and the control mode is switched from the overmodulation control mode to the PWM control mode. When the switching ends, the process proceeds to step S14 and the control is returned to the main routine.

Figure 9:
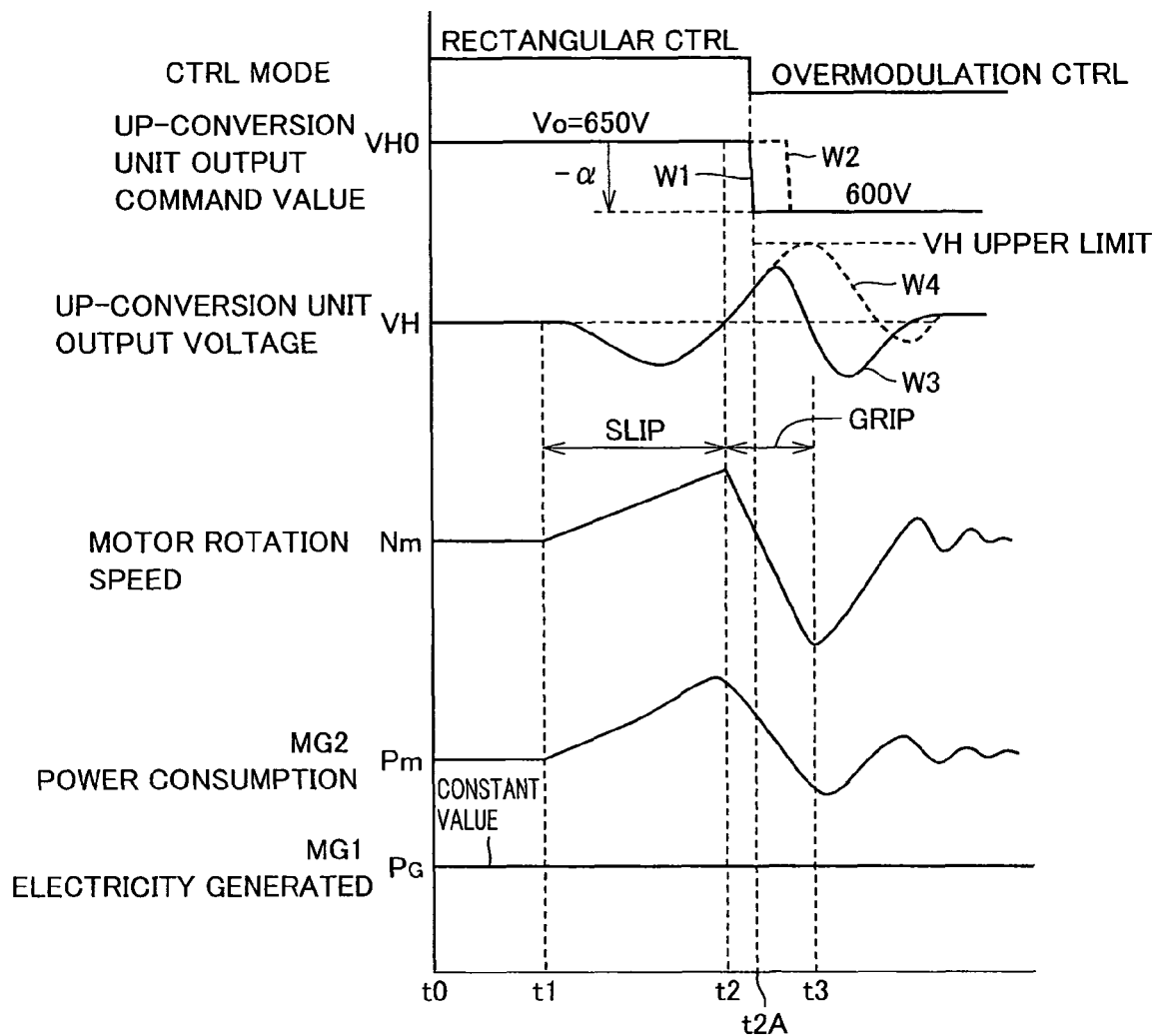
FIG. 9 is a diagram of operation waveforms related to the operation of the vehicle to which the present invention is applied.

FIG. 9 is a diagram of operation waveforms related to the operation of the vehicle to which the present invention is applied.

Referring to FIG. 9, normal, stable running state is shown from time point t0 to t1. Here, the up-conversion unit output command value VH0 is set to V0=650V as a target value, and up-conversion unit 20 is outputting a voltage of 650V as instructed.

Figure 20:
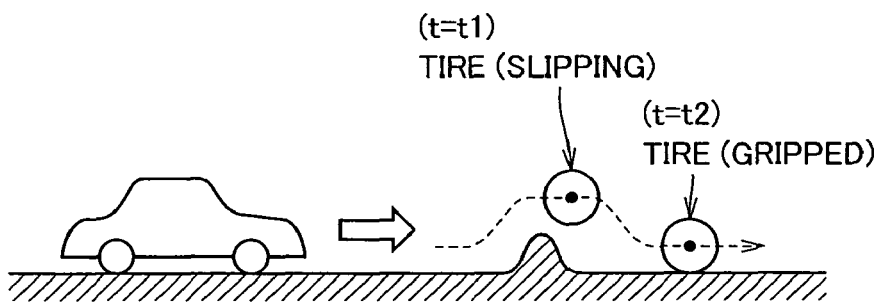
FIG. 20 illustrates the slipping state and the gripped state of a vehicle.

Assume that the tire slipped at time point t1 as shown in FIG. 20 and then landed on the ground at t2 to the gripped state. Here, between the time points t1 and t2, the motor rotation speed Nm increases, while the rotation torque of the motor is controlled such that it is kept constant. The energy is determined as energy=torque×rotation speed and, therefore, power consumption Pm of motor generator MG2 increases.

On the contrary, as the engine is rotating, a constant amount of electricity is generated and held in motor generator MG1. As a result, power consumption increases at inverter 14A and output voltage VH of the up-conversion unit decreases. Up-conversion unit 20 is controlled so that the decrease is recovered, and as a result, the output voltage VH that once decreased is returned to 650V.

Entering the gripped state at time point t2, the motor rotation speed Nm decreases rapidly, and therefore, power consumption Pm of motor generator MG2 also lowers in response. As a result, up-conversion unit 20 and inverter 14A come to be in a state of excessive energy, and from time point t2 to t2A, output voltage VH exceeds 650V.

Here, at time point t2A, the emergency switching occurs by which the control mode is changed from the rectangular wave control to the overmodulation control, and in response, the output voltage value of the up-conversion unit is lowered by α=50V as represented by the waveform W1, so that the output command value VH0 of the up-conversion unit is set to 600V. As a result, the output voltage VH of the up-conversion unit is controlled with a margin to the upper limit as represented by a waveform W3, and after the time point t3, it converges to a stable state.

By way of example, a control may be possible in which power consumption Pm of motor generator MG2 is monitored and when an inclination of steep decrease is detected, the output command value of the up-conversion unit is lowered. If such an approach is taken, however, calculation takes time longer than the switching to output command value VH0 in response to the switching of the control mode. Therefore, the voltage switching instruction is issued at the timing represented by a waveform W2 in dotted line, and the output voltage does not have much margin to the upper limit as can be seen from the waveform W4 in dotted line.

Therefore, according to the embodiment of the present invention, as the output command value of the up-conversion unit is lowered in a linked manner to the emergency switching of the inverter control mode, determination of a slip/grip can be made quickly, and excessive voltage at the inverter can be prevented with sufficient margin.

Further, as compared with control of the boosting converter to prevent excessive voltage at the inverter using a determination reference different from the emergency switching control of the inverter, for example, using calculation of power consumption, the computational load of the controller can be made smaller.

Embodiment 2

In the hybrid vehicle shown in FIG. 1, motor generators MG1 and MG2 and engine 200 have their torque controlled, and are coupled by planetary gear PG as a power distribution mechanism, to realize continuously variable transmission.

In order to realize both smaller size of the motor generator and required acceleration at high speed running, however, insertion of a transmission at a portion of propeller shaft transmitting power from the planetary gear to a differential gear DG to enable change in gear ratio has been proposed.

Figures 10, 11:
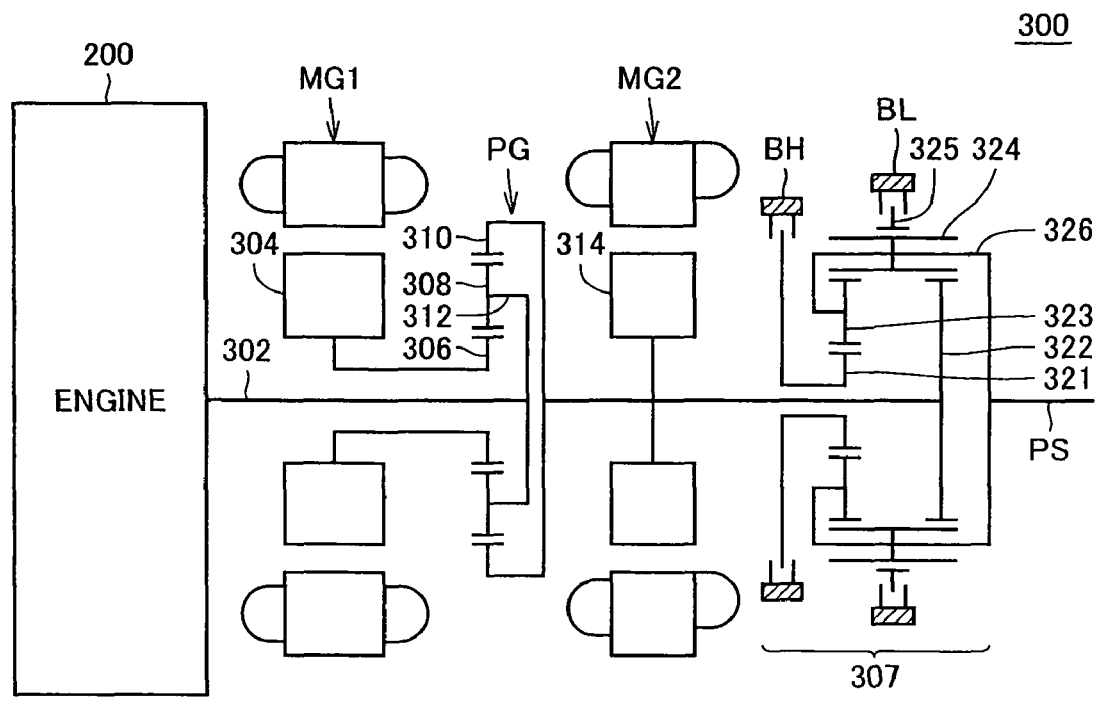
FIG. 10 shows a configuration of a hybrid vehicle 300 on which a transmission allowing two-stage switching of gear ratio is mounted.
FIG. 11 illustrates switching in transmission 307 of FIG. 10.

FIG. 10 shows a configuration of a hybrid vehicle 300 on which a transmission allowing two-stage switching of gear ratio is mounted.

Referring to FIG. 10, vehicle 300 includes engine 200, motor generator MG1, planetary gear PG, motor generator MG2, and a transmission 307. Up-conversion unit 20 and inverters 14 and 14A of vehicle 400 have the same configuration as those of hybrid vehicle 1 shown in FIG. 2 and, therefore, description thereof will not be repeated.

Planetary gear PG includes a sun gear 306 rotating integrally with a rotor 304 of motor generator MG1, a pinion gear 308 having center of rotation supported by a planetary carrier 312 coupled to a crankshaft 302 of engine 200 and rotating around sun gear 306, and a ring gear 410 as an internal gear meshing with the outer circumference of the pinion gear. Ring gear 310 rotates integrally with rotor 314 of motor generator MG2.

Transmission 307 is formed of a set of Ravigneau-type planetary gear mechanisms. Specifically, it is provided with sun gears 321 and 322 that are external gears. Sun gear 321 meshes with pinion gear 323, pinion gear 323 meshes with a second pinion gear 324, and the second pinion gear 324 meshes with a ring gear 325 arranged concentrically with sun gears 321 and 322.

Pinion gears 323 and 324 are both supported by a planetary carrier 326 in a manner allowing rotation and revolution.

Sun gear 322 meshes with pinion gear 324. Therefore, sun gear 321 and ring gear 325 form, together with pinion gears 323 and 324, a mechanism that corresponds to a double-pinion type planetary gear mechanism. Further, sun gear 322 and ring gear 325 form, together with pinion gear 324, a mechanism that corresponds to a single-pinion type planetary gear mechanism.

Further, transmission 307 is provided with a brake BH for selectively fixing sun gear 321, and a brake BL for selectively fixing ring gear 325. These brakes BH and BL are so-called friction engagement device that generates engaging force by friction, and a multi-plate type engaging device or a band type engaging device may be used.

FIG. 11 illustrates switching in transmission 307 of FIG. 10.

Referring to FIGS. 10 and 11, in transmission 307, sun gear 322 is a so-called input element and carrier 326 is an output element. When brake BH is engaged, a high-speed gear of smaller gear ratio is set, and when brake BL is engaged in place of brake BH, a low speed gear of higher gear ratio than the high-speed gear is set.

Figure 12:
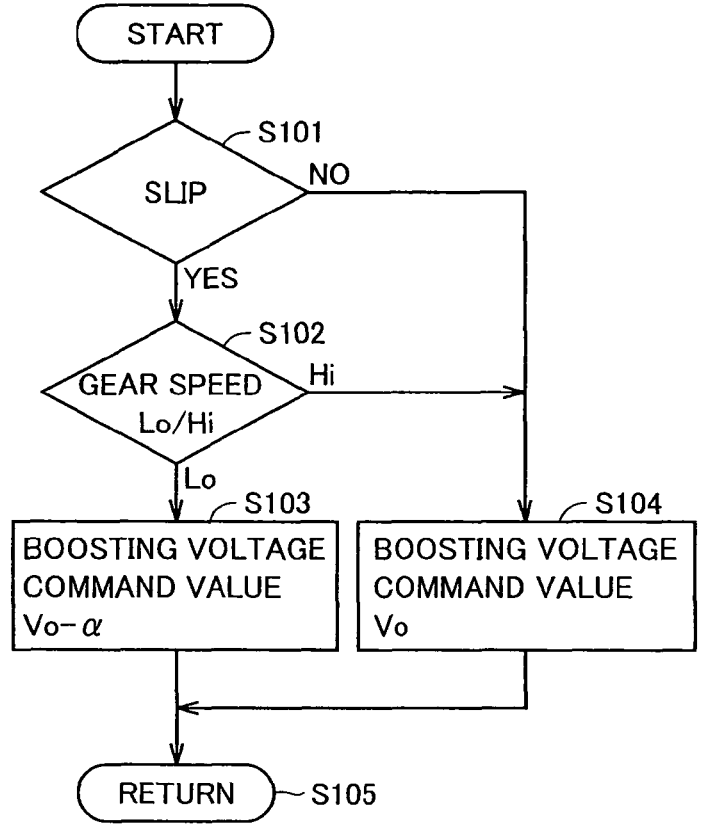
FIG. 12 is a flowchart representing control of the boosting converter executed in accordance with Embodiment 2.

FIG. 12 is a flowchart representing control of the boosting converter executed in accordance with Embodiment 2.

Referring to FIG. 12, when the process starts, first, whether there is a slip occurred at the driving wheel or not is determined at step S101.

When a slip occurs and same torque command has been issued from controller 30 to motor generator MG2, the rotation speed increases abruptly, and therefore, power consumption at motor generator MG2 increases abruptly. It is determined that a slip occurred, when the amount of change in the electrical power exceeding a prescribed value is detected.

If it is determined at step S101 that a slip occurred, the process proceeds to step S102. If it is not determined at step S101 that a slip occurred, the process proceeds to step S104.

At step S102, whether the gear of transmission 307 is low or high is determined. Specifically, when brake BH is controlled in the engaged state, the gear is determined to be set high, and when brake BL is in the engaged state, the gear is determined to be set low.

When it is determined at step S102 that the gear speed is low, the process proceeds to step S103. On the other hand, if it is determined that the gear speed is high, the process proceeds to step S104.

Step S103 corresponds to a situation in which a slip has occurred and the gear has been at the low speed at the time of the slip. In such a situation, rotation varies over a wide range at the time of the slip, and excessive energy is considerably large at the time of a grip. Therefore, after the slip and before the grounding and grip of the tire, the boost voltage command value V0 is lowered in advance at step S103 by −α. In this manner, the state of excessive energy at the time of the grip can be alleviated.

On the other hand, if the process proceeds to step S104, the situation is that no slip occurred or if a slip has occurred, the gear has been high and the range of variation of rotation at the time of the slip is relatively small. In such a situation, following control is possible without changing the boost voltage command value, and therefore, the boost voltage command value is maintained at V0.

After the end of the process at step S103 or S104, the control is passed to the main routine at step S105.

Figure 13:
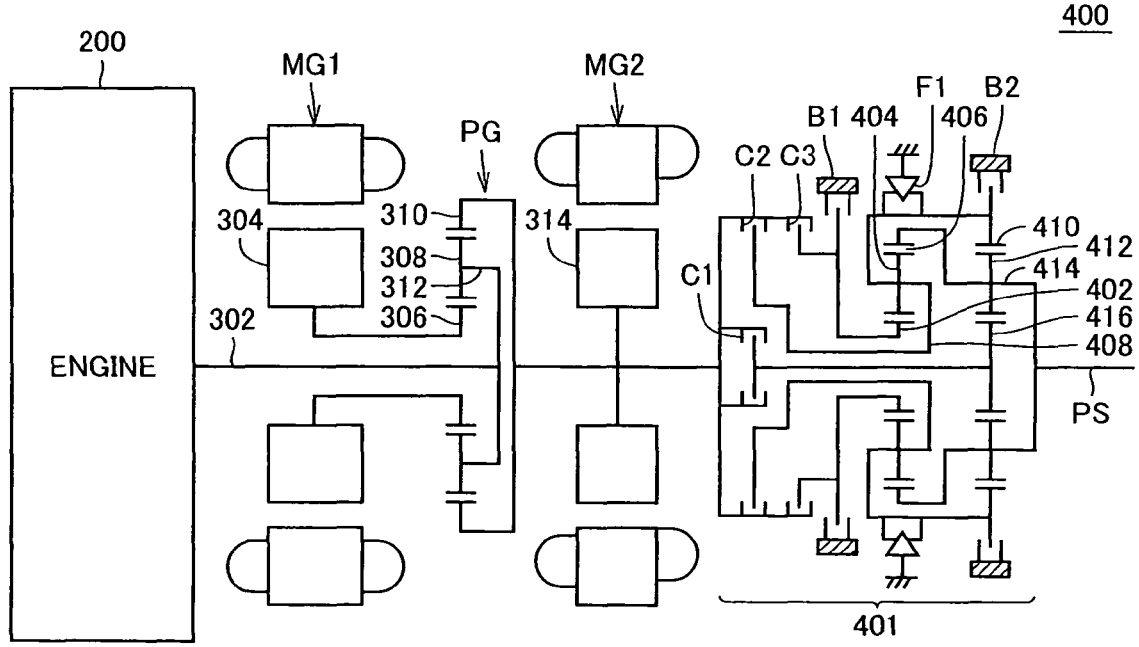
FIG. 13 shows a configuration of a hybrid vehicle 400 on which a 4-speed transmission is mounted.

FIG. 13 shows a configuration of a hybrid vehicle 400 on which a 4-speed transmission is mounted.

Referring to FIG. 13, a hybrid vehicle 400 includes engine 200, motor generators MG1 and MG2, planetary gear PG, and a transmission 401. Engine 200, motor generator MG1, planetary gear PG and motor generator MG2 have similar configurations as those of vehicle 300 described with reference to FIG. 10 and, therefore, description thereof will not be repeated.

Transmission 401 includes clutches C1 to C3, brakes B1 and B2, a one-way clutch F1 and first and second planetary gear mechanisms.

The first planetary gear mechanism includes a sun gear 402, a pinion gear 404, a ring gear 406 and a planetary carrier 408.

The second planetary gear mechanism includes a sun gear 461, a pinion gear 412, a ring gear 410 and a planetary carrier 414.

Sun gear 402 can be fixed by a brake B1, and can be fixed by clutch C3 to rotate integrally with rotor 314 of motor generator MG2. Pinion gear 404 meshes with sun gear 402, and supported by planetary carrier 408 in a manner allowing rotation and revolution. Planetary carrier 408 can be fixed by clutch C2 to rotate integrally with rotor 314 of motor generator MG2, and can be fixed by brake B2 to prevent rotation. Further, one-way clutch F1 is provided so that planetary carrier 408 has its operation limited to rotate only in one direction.

Pinion gear 404 further meshes with ring gear 406 as an internal gear. Ring gear 406 is linked to planetary carrier 414 and propeller shaft PS, and rotates integrally with these elements.

Sun gear 416 is an external gear, and it can be fixed by clutch C1 to rotate integrally with rotor 314 of motor generator MG2. Pinion gear 412 meshes with sun gear 416, and supported by planetary carrier 414 in a manner allowing rotation and revolution.

The outer circumference of pinion gear 412 meshes with ring gear 410 as an internal gear. Ring gear is linked to planetary carrier 408 to rotate integrally therewith, and it can be fixed by brake B2.

FIG. 14 illustrates the gear change operation of transmission 401.

Referring to FIGS. 13 and 14, when the gear ratio of the first speed (1ST) is to be attained, clutch C1 is brought to the engaged state, and clutches C2 and C3 and brake B1 are brought to the released state. Brake B2 is brought to the engaged state only when engine brake is to be effected. At the first speed, ring gear 410 rotates only in one direction, because of the function of one-way clutch F1.

When the gear ratio is to be set to the second speed (2ND), clutch C1 and brake B1 are engaged and clutches C2 and C3 and brake B2 are released.

When the gear ratio is to be set to the third speed (3RD), clutches C1 and C2 are engaged and clutch C3 and brakes B1 and B2 are released.

When the gear ratio is to be set to the fourth speed (4TH), clutch C2 and brake B1 are engaged and clutches C1 and C3 and brake B2 are released.

When the reverse gear (REV) is to be set, clutch C3 and brake B2 are engaged and clutches C1 and C2 and brake B1 are released.

Figure 15:
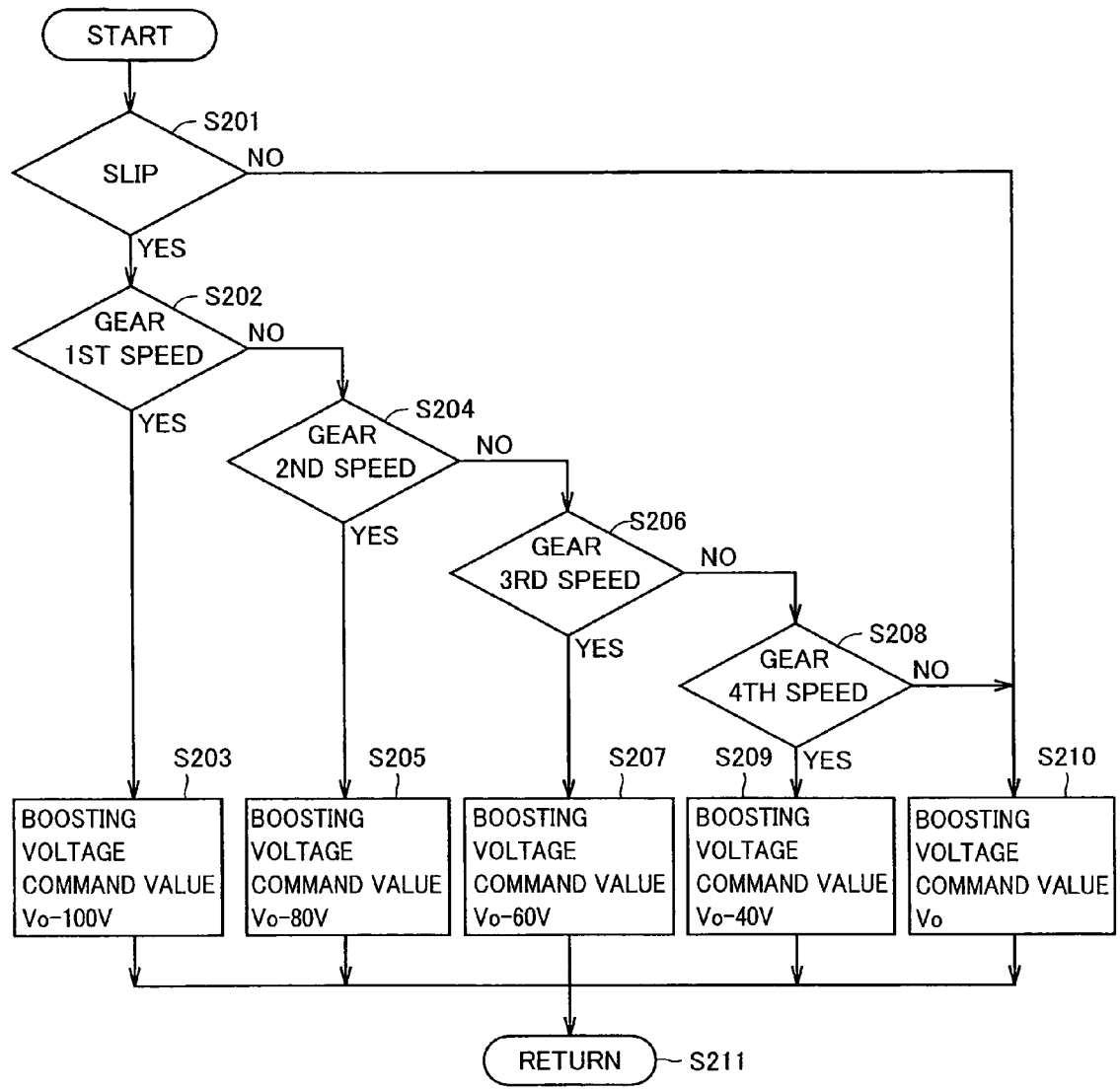
FIG. 15 is a flowchart representing control for determining a command value of the boosting voltage of vehicle 400.

FIG. 15 is a flowchart representing control for determining a command value of the boosting voltage of vehicle 400. The process in accordance with the flowchart is called from a prescribed main routine and executed at every prescribed time period or every time prescribed conditions are satisfied.

Referring to FIG. 15, when the process starts, first, at step S201, whether a slip occurred or not is determined. If it is determined that a slip occurred, the process proceeds to step S202. If it is not determined that a slip occurred, the process proceeds to step S210.

At step S202, whether the gear of transmission 401 is the first speed or not is determined. If it is determined that transmission 401 is in the first speed, the process proceeds to step S203, and if it not determined to be the first speed, the process proceeds to step S204.

At step S203, a command is issued to lower the boosting voltage command value V0 of boosting converter 12 by −100V.

At step S204, whether the gear of transmission 401 is the second speed or not is determined. If it is determined to be the second speed, the process proceeds to step S205, and if it is determined not to be the second speed, the process proceeds to step S206.

At step S205, a command is issued to lower the boosting voltage command value V0 of boosting converter 12 by −80V.

When the process proceeds to step S206, whether the gear of transmission 401 is the third speed or not is determined. If it is determined to be the third speed, the process proceeds to step S207, and if it is determined not to be the third speed, the process proceeds to step S208.

At step S207, a command is issued to lower the boosting voltage command value V0 of boosting converter 12 by −60V.

When the process proceeds to step S208, whether the gear of transmission 401 is the fourth speed or not is determined. If it is determined to be the fourth speed, the process proceeds to step S209, and if it is determined not to be the fourth speed, the process proceeds to step S210.

At step S209, a command is issued to lower the boosting voltage command value V0 of boosting converter 12 by −40V.

At step S210, the present boosting voltage command value V0 is maintained.

After the end of the process of any of steps S203, S205, S207, S209 and S210, the control is passed to the main routine at step S211.

As described above, when a transmission is arranged between the output shaft of motor generator MG2 and the wheel, the influence of a slip on the inverter and on the boosting converter differs dependent on the gear speed of the transmission. Therefore, by controlling the command value of the boosting converter in accordance with the gear speed, optimal control can be realized.

Similarly, control mode switching can be set utilizing the information of the gear speed.

Figure 16:
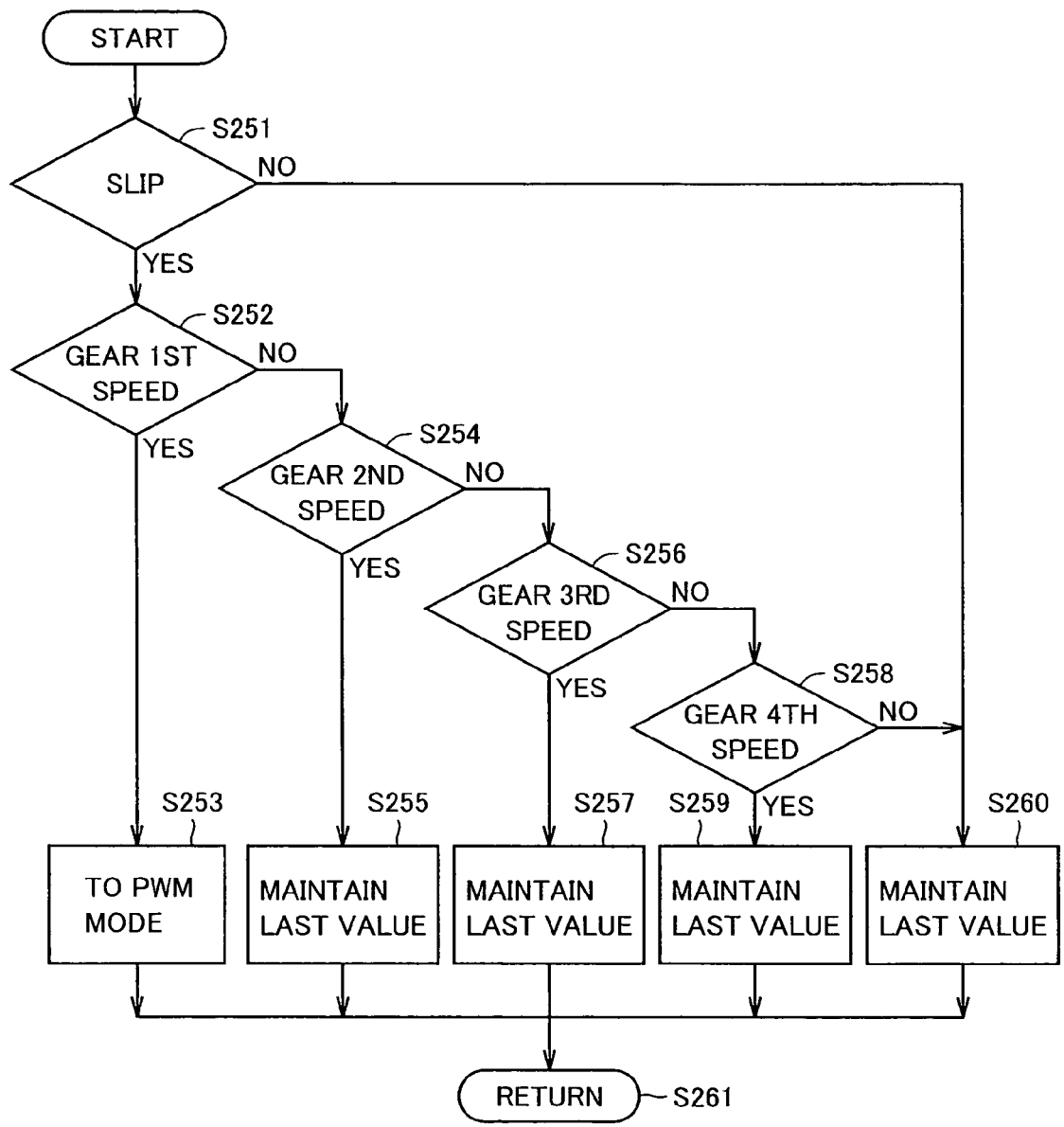
FIG. 16 is a flowchart representing control of switching of the control mode utilizing information on the gear speed.

FIG. 16 is a flowchart representing control of switching the control mode utilizing information on the gear speed. The process in accordance with the flowchart is called from a prescribed main routine and executed at every prescribed time period or every time prescribed conditions are satisfied.

Referring to FIG. 16, when the process starts, first, at step S251, whether a slip occurred or not is determined. If it is determined that a slip occurred, the process proceeds to step S252. If it is not determined that a slip occurred, the process proceeds to step S260.

At step S252, whether the gear of transmission 401 is the first speed or not is determined. If it is determined that transmission 401 is in the first speed, the process proceeds to step S253, and if it not determined to be the first speed, the process proceeds to step S254.

At step S253, the control mode of inverter 14A executed by controller 30 is set to the sinusoidal PWM mode of good response.

At step S254, whether the gear of transmission 401 is the second speed or not is determined. If it is determined to be the second speed, the process proceeds to step S255, and if it is determined not to be the second speed, the process proceeds to step S256.

At step S255, as the control mode of inverter 14A, the control mode determined by the routine in accordance with this flowchart last time is maintained.

When the process proceeds to step S256, whether the gear of transmission 401 is the third speed or not is determined. If it is determined to be the third speed, the process proceeds to step S257, and if it is determined not to be the third speed, the process proceeds to step S258.

At step S257, as the control mode of inverter 14A, the control mode determined by the routine in accordance with this flowchart last time is maintained.

When the process proceeds to step S258, whether the gear of transmission 401 is the fourth speed or not is determined. If it is determined to be the fourth speed, the process proceeds to step S259, and if it is determined not to be the fourth speed, the process proceeds to step S260.

At step S259, as the control mode of inverter 14A, the control mode determined by the routine in accordance with this flowchart last time is maintained.

At step S210 also, as the control mode of inverter 14A, the control mode determined by the routine in accordance with this flowchart last time is maintained.

After the end of the process of any of steps S253, S255, S257, S259 and S260, the control is passed to the main routine at step S211.

The process at step S255, S257 or S259 may be set to the overmodulation PWM control mode having second best response to the sinusoidal PWM control mode.

Figure 17:
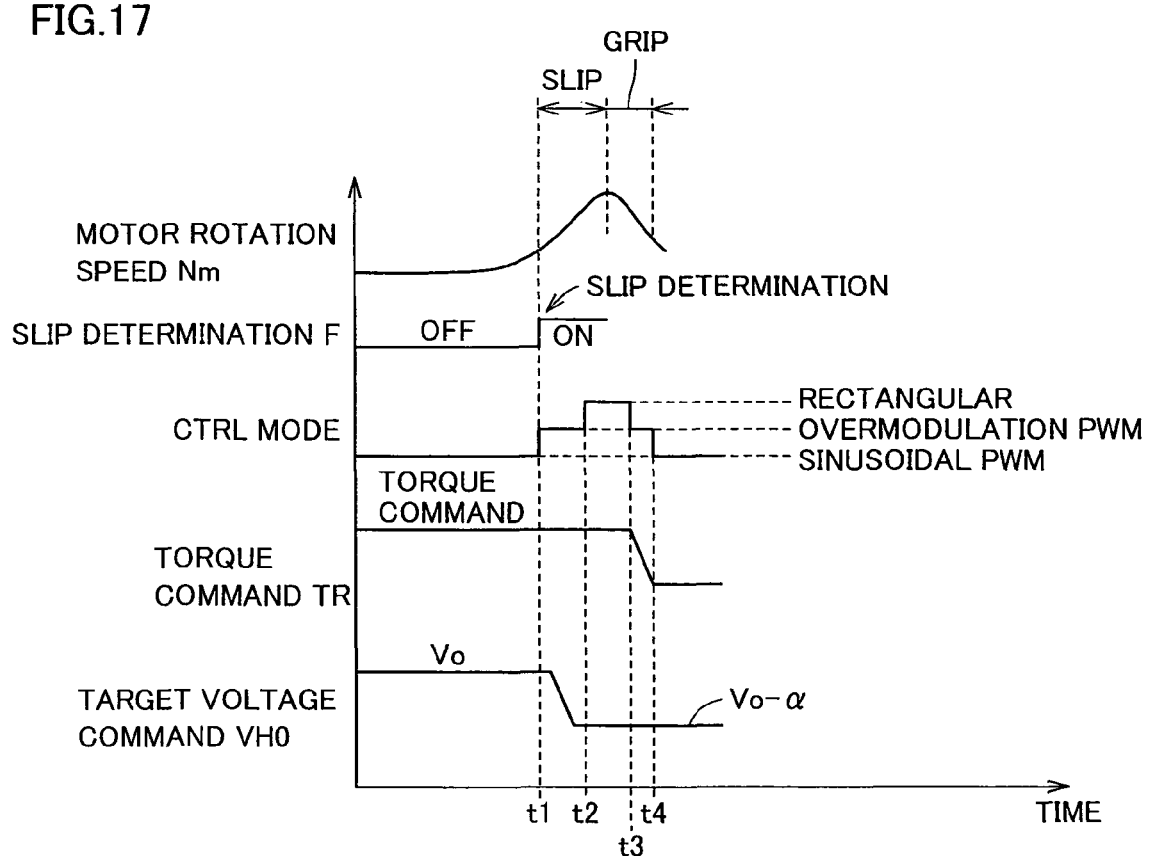
FIG. 17 is a diagram of operation waveforms showing an example in which control of Embodiment 2 is executed.

FIG. 17 is a diagram of operation waveforms showing an example in which control of Embodiment 2 is executed.

Referring to FIG. 17, the abscissa represents time, and motor rotation speed Nm, control mode, torque command TR and target voltage command VH0 of boosting converter 12 are plotted.

Until time point t1, the vehicle runs normally, and between t1 and t2, idle rotation of a wheel occurs and the vehicle is in a slipping state, as it runs on an obstacle or the like. At this time, a slip determination flag F is turned from off to on, because of an increase of current or the like. In response, the control mode is switched at time t1 from the sinusoidal PWM control mode to the overmodulation PWM control mode, and at time t2, further from the overmodulation PWM control mode to the rectangular wave control mode.

Figure 18:
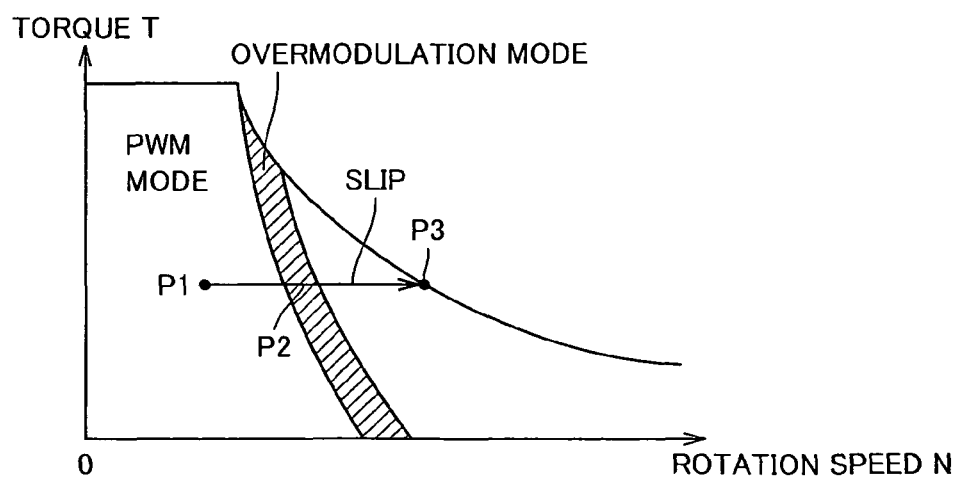
FIG. 18 illustrates switching of the control mode.

FIG. 18 illustrates switching of the control mode.

By way of example, if the transmission gear is low when slipped, the range of variation of the rotation speed is wide as the initial torque is large at the time of the slip. In other words, the rotation speed increases to a high value. Therefore, referring to FIG. 18, the rotation speed N increases while the torque T is approximately the same, and the control mode makes a transition from the sinusoidal PWM control mode at point P1 to the overmodulation PWM control mode at point P2, and further to the rectangular wave control mode at point P3.

Immediately after the slip, between time points t2 and t3, the wheel makes a transition to the gripped state, and between time points t3 and t4, the motor rotation speed Nm decreases. If the control mode immediately after the slip is the rectangular control and gripping occurs abruptly, control response is insufficient, possibly resulting in control failure.

In order to prevent such a situation, the control mode should be switched in advance to the sinusoidal PWM control mode of good controllability if the gear speed is low, which has significant influence, when determination of a slip is made.

Figure 19:
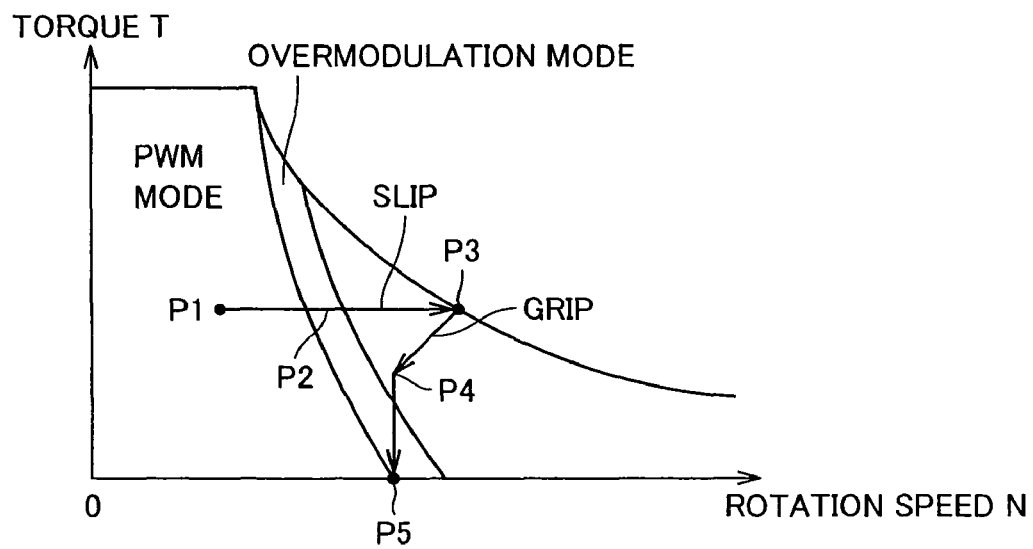
FIG. 19 further illustrates switching of the control mode after occurrence of a grip.

FIG. 19 further illustrates the switching of the control mode after occurrence of a grip.

Referring to FIGS. 17 and 19, between time points t3 and t4, the control mode is switched from the rectangular control mode to the overmodulation PWM control mode and further to the sinusoidal PWM control mode.

In FIG. 19, the control mode is switched to the sinusoidal PWM mode at point P5, from point P3 through point P4. Here, on some regions of the map plotting the rotation speed and the torque, the torque is much reduced and possibly attains to 0 torque as shown in FIG. 19, and such phenomenon is tolerated here. As the torque is reduced here, power consumption of motor generator MG2 decreases rapidly, and therefore, the amount of electricity generated by motor generator MG1 may be excessive, possibly causing increase of the voltage at capacitor C2 shown in FIG. 2.

To address such a problem, the target value of boosting voltage is lowered in advance if the transmission is in the low gear at the determination of a slip. Further, when multi-speed transmission such as shown in FIG. 15 is used, the amount of decreasing the target value of boosting voltage may be changed in multiple stages, in accordance with the gear speed.

As described above, in Embodiment 2, in a vehicle in which gear speed is changed by a transmission, as the range of energy variation differs dependent on the gear speed, the control mode and target voltage appropriate for the gear speed are set, so the range of variation of the target voltage is minimized while excessive voltage at the inverter can be prevented.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A controller for a vehicle including at least one motor driving wheels, an inverter driving said motor, and a boosting converter supplying a dc power supply current to said inverter, comprising
a control portion performing rectangular wave control and non-rectangular wave control on said inverter in a switched manner; wherein
said control portion has an emergency switching condition for switching control from said rectangular wave control to said non-rectangular wave control upon detection of a slip of a wheel, as a determination reference, and when said emergency switching condition is satisfied while said rectangular wave control is being executed, said control portion instructs said boosting converter to perform a process for preventing excessive voltage of said inverter.

2. The vehicle controller according to claim 1, wherein
said control portion indicates a target voltage of boosting to said boosting converter, and said target voltage is lowered as the process for preventing excessive voltage of said inverter.

3. The vehicle controller according to claim 1, wherein
said non-rectangular wave control is overmodulation PWM control or sinusoidal PWM control.

4. The vehicle controller according to claim 1, wherein
said control portion determines whether said emergency switching condition is satisfied or not in accordance with a current flowing from said inverter to said motor.

5. The vehicle controller according to claim 4, wherein
said control portion determines that said emergency switching condition is satisfied when a q-axis current supplied from said inverter to said motor exceeds a prescribed threshold value.

6. The vehicle controller according to claim 5, wherein
said prescribed threshold value of said q-axis current is determined in advance in correspondence to an I-axis current supplied from said inverter to said motor.

7. The vehicle controller according to claim 1, wherein
said vehicle further includes a multi-speed transmission for transmitting, with variable speed, driving force of said motor to an axle; and
said control portion changes an instruction to said boosting converter in accordance with the speed of said multi-speed transmission, when said emergency switching condition is satisfied.

8. A vehicle, comprising:
at least one motor driving wheels;
an inverter driving said motor;
a boosting converter supplying a dc power supply current to said inverter; and
a control portion performing rectangular wave control and non-rectangular wave control on said inverter in a switched manner; wherein
said control portion has an emergency switching condition for switching control from said rectangular wave control to said non-rectangular wave control upon detection of a slip of a wheel, as a determination reference, and when said emergency switching condition is satisfied while said rectangular wave control is being executed, said control portion instructs said boosting converter to perform a process for preventing excessive voltage of said inverter.

9. The vehicle according to claim 8, wherein
said control portion indicates a target voltage of boosting to said boosting converter, and said target voltage is lowered as the process for preventing excessive voltage of said inverter.

10. The vehicle according to claim 8, wherein
said non-rectangular wave control is overmodulation PWM control or sinusoidal PWM control.

11. The vehicle according to claim 8, wherein
said control portion determines whether said emergency switching condition is satisfied or not in accordance with a current flowing from said inverter to said motor.

12. The vehicle according to claim 11, wherein
said control portion determines that said emergency switching condition is satisfied when a q-axis current supplied from said inverter to said motor exceeds a prescribed threshold value.

13. The vehicle according to claim 12, wherein
said prescribed threshold value of said q-axis current is determined in advance in correspondence to an I-axis current supplied from said inverter to said motor.

14. The vehicle according to claim 8, further comprising
a multi-speed transmission for transmitting, with variable speed, driving force of said motor to an axle; wherein
said control portion changes an instruction to said boosting converter in accordance with the speed of said multi-speed transmission, when said emergency switching condition is satisfied.

15. A method of controlling a vehicle including at least one motor driving wheels, an inverter driving said motor, and a boosting converter supplying a dc power supply current to said inverter, comprising the steps of:
determining whether rectangular wave control is being executed on said inverter or not; and
instructing, when an emergency switching condition for switching control from said rectangular wave control to non-rectangular wave control is satisfied upon detection of a slip of a wheel, while said rectangular wave control is being executed, said boosting converter to perform a process for preventing excessive voltage of said inverter.

16. The method of controlling a vehicle according to claim 15, wherein
said vehicle further includes a multi-speed transmission for transmitting, with variable speed, driving force of said motor to an axle;
said control method further comprising the step of
changing an instruction to said boosting converter in accordance with the speed of said multi-speed transmission, when said emergency switching condition is satisfied.

* * * * *